United States Patent
Ahmed et al.

(10) Patent No.: US 9,940,101 B2
(45) Date of Patent: Apr. 10, 2018

(54) TININESS PREDICTION AND HANDLER ENGINE FOR SMOOTH HANDLING OF NUMERIC UNDERFLOW

(71) Applicant: Samsung Electronics Co., Ltd., Suwon-si, Gyeonggi-do (KR)

(72) Inventors: Ashraf Ahmed, Austin, TX (US); Nicholas Todd Humphries, Austin, TX (US); Marc Augustin, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 47 days.

(21) Appl. No.: 15/067,159

(22) Filed: Mar. 10, 2016

(65) Prior Publication Data
US 2017/0060533 A1    Mar. 2, 2017

Related U.S. Application Data

(60) Provisional application No. 62/209,874, filed on Aug. 25, 2015.

(51) Int. Cl.
*G06F 7/499* (2006.01)
*G06F 7/483* (2006.01)
*G06F 9/48* (2006.01)

(52) U.S. Cl.
CPC .......... *G06F 7/483* (2013.01); *G06F 7/4991* (2013.01); *G06F 9/4843* (2013.01)

(58) Field of Classification Search
None
See application file for complete search history.

(56) References Cited

U.S. PATENT DOCUMENTS 5,812,439 A    9/1998  Hansen
6,571,265 B1   5/2003  Story
(Continued)

OTHER PUBLICATIONS

Hauser, J.R., "Handling Floating-Point Exceptions in Numeric Programs," ACM Transactions on Programming Languages and Systems, vol. 18, No. 2, Mar. 1996, pp. 139-174, ISSN: 0164-0925; DOI: 10.1145/227699.227701; Publisher: ACM, USA.
(Continued)

*Primary Examiner* — David H Malzahn
(74) *Attorney, Agent, or Firm* — Renaissance IP Law Group LLP

(57) ABSTRACT

Embodiments of the present disclosure include a tininess prediction and handler engine for handling numeric underflow while streamlining the data path for handling normal range cases, thereby avoiding flushes, and reducing the complexity of a scheduler with respect to how dependent operations are handled. A preemptive tiny detection logic section can detect a potential tiny result for the function or operation that is being performed, and can produce a pessimistic tiny indicator. The tininess prediction and handler engine can further include a subnormal post-processing pipe, which can denormalize and round one or more subnormal operations while in a post-processing mode. A schedule modification logic section can reschedule in-flight operations. The schedule modification logic section can issue dependent operations optimistically assuming that a producing operation will not produce a tiny result, and so will not incur extra latency associated with fixing the tiny result in the post-processing pipe.

18 Claims, 8 Drawing Sheets

(56) References Cited

U.S. PATENT DOCUMENTS

| | | | |
|---|---|---|---|
| 6,697,832 B1 | 2/2004 | Kelley et al. | |
| 6,701,427 B1 | 3/2004 | Hinds et al. | |
| 7,373,489 B1* | 5/2008 | Brooks | G06F 9/3851 |
| | | | 708/495 |
| 7,593,977 B2 | 9/2009 | Cornea-Hasegan | |
| 2004/0059769 A1* | 3/2004 | Cornea-Hasegan | G06F 7/5443 |
| | | | 708/498 |
| 2004/0098439 A1* | 5/2004 | Bass | G06F 7/4991 |
| | | | 708/552 |
| 2004/0122885 A1* | 6/2004 | Cornea-Hasegan | G06F 7/483 |
| | | | 708/495 |
| 2017/0060533 A1* | 3/2017 | Ahmed | G06F 7/483 |

OTHER PUBLICATIONS

Sheikh, Basit Riaz, et al., "An Asynchronous Floating-Point Multiplier," 2012 18th IEEE International Symposium on Asynchronous Circuits and Systems (ASYNC), pp. 89-96, 2012; ISBN-13: 978-1-4673-1360-5; DOI: 10.1109/ ASYNC.2012.19; May 7-9, 2012, Lyngby, Denmark.

* cited by examiner

TININESS PREDICTION AND HANDLER ENGINE FOR SMOOTH HANDLING OF NUMERIC UNDERFLOW

RELATED APPLICATION DATA

This application claims the benefit of U.S. Patent Application Ser. No. 62/209,874, filed Aug. 25, 2015, which is hereby incorporated by reference.

BACKGROUND

The present disclosure relates to digital circuits, and more particularly, to a tininess prediction and handler engine for smooth handling of numeric underflow in floating point units.

Floating-point units (FPUs) are designed to perform various mathematical operations on floating-point numbers. For example, FPUs can include a floating point adder, multiplier, multiply-accumulate function, and so forth. FPUs need to deal with a problem of numeric underflow. Numeric underflow occurs when there is a result that is tiny enough to not fit within a normal number range as defined by, for example, a standard such as IEEE754. When numeric underflow is detected, additional steps are usually needed to compute the final result. The detection of underflow also happens relatively late in a typical computational pipeline, thereby making it a challenge to handle such cases efficiently.

The additional steps that are needed to handle underflow involve denormalizing the intermediate result, rounding that value, and in some micro-architectures, further re-normalization. Cumulatively, these steps require logic of fairly significant depth including one or more stages in a high-frequency pipeline. When tininess is detected, further processing is needed, for example, to perform the denormalization and rounding. Typically, tininess can only be accurately determined very late in the pipeline.

Dependent operations usually have already been scheduled or are likely already in-flight when the tininess problem is detected. Conventionally, such dependent operations cannot start execution in a normal fashion as they have to wait for the producer to finish its extra computation steps. Further exacerbating this problem is that dependents of dependents (i.e., grandchild dependent operations) may also be in the process of being scheduled.

One approach to addressing the tininess problem is to flush the machine of all operations younger than the tiny-generating operation. But this approach is expensive in terms of performance. Another is to identify and kill only the children and any grandchildren operations, although such an approach is non-trivial in terms of scheduling complexity. Yet another approach is to have the data path handle subnormal (i.e., problem) operations in-pipe. The problem with this approach is that extra gate depth is needed, which affects all numeric cases—not just the tiny-generating cases.

BRIEF SUMMARY

Embodiments of the present disclosure can include a tininess prediction and handler engine. The tininess prediction and handler engine can include a scheduler having a scheduler modification logic section configured to pick one or more floating point operations, and a functional pipe coupled to the scheduler and configured to receive the picked one or more floating point operations. The functional pipe can include a pre-emptive tiny detection logic section configured to predict a subnormal result associated with the one or more floating point operations. The tininess prediction and handler engine can further include a subnormal trombone post-processing pipe coupled to the functional pipe, which can be configured to receive the one or more floating point operations while in a post-processing mode.

Embodiments of the present disclosure can include a method for handling numeric underflow using a tininess prediction and handler engine. The method can include picking, by a scheduler modification logic section of a scheduler, one or more floating point operations. The method can include receiving, by a functional pipe, the picked one or more floating point operations. The method can include predicting, by a pre-emptive tiny detection logic section of the functional pipe, a subnormal result associated with the one or more floating point operations. The method can include receiving, by a subnormal trombone post-processing pipe, the one or more floating point operations while in a post-processing mode.

Embodiments of the present disclosure can include a mobile device. The mobile device can include a processor, a display coupled to the processor, a user interface configured to be displayed on the display, and a tininess prediction and handler engine coupled to the processor.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
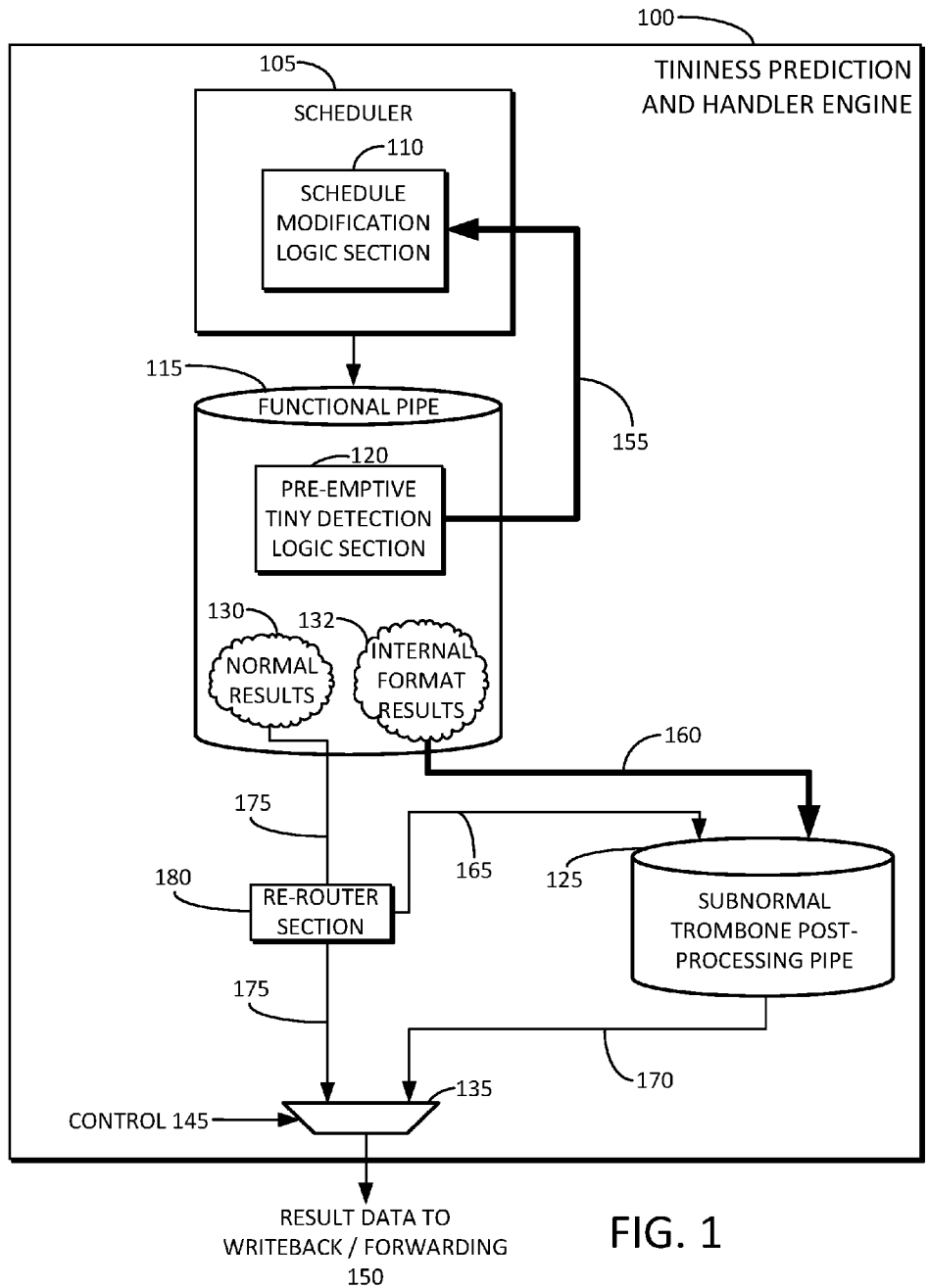
FIG. 1 is an example block diagram of a tininess prediction and handler engine for handling numeric underflow in accordance with embodiments of the present disclosure.

Reference will now be made in detail to embodiments of the present disclosure, examples of which are illustrated in the accompanying drawings. In the following detailed description, numerous specific details are set forth to enable a thorough understanding of the present disclosure. It should be understood, however, that persons having ordinary skill in the art may practice the embodiments of the present disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first logic circuit could be termed a second logic circuit, and, similarly, a second logic circuit could be termed a first logic circuit, without departing from the scope of the embodiments of the present disclosure.

The terminology used in the description herein is for the purpose of describing particular embodiments only and is not intended to be limiting of the embodiments of the present disclosure. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the present disclosure include a tininess prediction and handler engine for handling numeric underflow while streamlining the data path for handling normal range cases, thereby avoiding flushes, and reducing the complexity of a scheduler with respect to how dependent operations are handled. A preemptive tiny detection logic section can detect a potential tiny result for the function or operation that is being performed, and can produce a pessimistic tiny indicator. The pessimistic tiny indicator indicates a result that is tiny enough (e.g., numeric underflow) to not fit within a normal number range. Such preemptive tiny detection can occur relatively early in the data path. That is, such preemptive tiny detection can occur at an earlier time relative to fully accurate tiny detection that otherwise occurs late in the data path.

In accordance with embodiments of the present disclosure, the tininess prediction and handler engine can further include a subnormal "trombone" post-processing pipe. The post-processing pipe can, for example, accept internal-format tiny numbers and produce a correctly rounded IEEE754-compliant result. The post-processing pipe supports, for example, a denormalization function followed by a rounding function. Moreover, the post-processing pipe can perform pass-through of numbers when no format change is required by the micro-architecture. The post-processing pipe can also perform conversion of an internal format number into an IEEE754 number, with no modification in value.

In accordance with embodiments of the present disclosure, the scheduler can include a schedule modification logic section, which can react to the pessimistic tiny indicator provided by the preemptive tiny detection logic section. The schedule modification logic section can reschedule in-flight operations to compensate. The schedule modification logic section can issue dependent operations optimistically assuming that a producing operation will not produce a tiny result, and so will not incur extra latency associated with fixing the tiny result in the post-processing pipe.

FIG. 1 is an example block diagram of a tininess prediction and handler engine 100 for handling numeric underflow in accordance with embodiments of the present disclosure. The tininess prediction and handler engine 100 can be implemented as a circuit, firmware, hardware, software, or any combination thereof. The tininess prediction and handler engine 100 can include a scheduler 105, a functional pipe 115, a subnormal trombone post-processing pipe 125, and a selector such as a multiplexor 135. The scheduler 105 can include a schedule modification logic section 110. The scheduler 105 can be coupled to the functional pipe 115. The functional pipe 115 can include a preemptive tiny detection logic section 120.

The preemptive tiny detection logic section 120 can produce a pessimistic tiny indicator 155, and transmit the pessimistic tiny indicator 155 to the schedule modification logic section 110 of the scheduler 105, as further described below. The pessimistic tiny indicator 155 can indicate a result that is tiny enough (e.g., numeric underflow) to not fit within a normal number range. The functional pipe 115 can be coupled to the subnormal trombone post-processing pipe 125. The multiplexor 135 can select between an output of the functional pipe 115 via line 175 and an output of the subnormal trombone post-processing pipe 125 via line 170 responsive to a control signal 145.

The pessimistic tiny indicator 155 is referred to as "pessimistic" because the determination of a potential tiny result includes a small amount of pessimism. In other words, the pessimistic tiny indicator 155 is not only asserted for all tiny-generating cases, but in addition, the pessimistic tiny indicator 155 can be asserted for a small number of non-tiny-generating cases. The penalty of this pessimism is fairly small. The non-tiny-generating cases in which the pessimistic tiny indicator 155 is asserted can be minimized as a function of timing. For example, the pessimistic tiny indicator 155 can be produced sufficiently in time to make it back to the schedule modification logic section 110 of the scheduler 105 so that the schedule modification logic section 110 can update or otherwise modify scheduling decisions of dependent operations.

Regarding the preemptive tiny detection logic section 120, a potential tiny result can be detected for the operation that is being performed. For example, in the case of a floating point multiplication operation, the preemptive tiny detection logic section 120 can determine a sum of exponents of input operands (e.g., opA_exp+opB_exp). If the sum of exponents is close to or within a predefined tiny range as defined by, for example, the IEEE754 standard, then the pessimistic tiny indicator 155 can be transmitted to the schedule modification logic section 110 of the scheduler 105.

To make the pessimistic tiny indicator 155 more accurate, the preemptive tiny detection logic section 120 can examine one or more of the top (i.e., most significant) bits of product sum and product carry vectors. For example, the top three or four bits can be examined, which can predict with a high degree of confidence whether the result is in a range from 1 to 2, or from 2 to 4. More specifically, when the result is predicted to be in the range from 1 to 2 (e.g., 1<=predicted result <2), then the sum of the exponents can be considered to be a sufficiently accurate estimate. When the result is predicted to be in the range from 2 to 4 (e.g., 2<=predicted result <4), then a more accurate sum of the exponents can be considered to be the sum of the exponents plus 1. In either case, there is no need to wait for a full add, and therefore, computational latency can be reduced. This more speculative approach allows for early signaling of the scheduler 105 so that correct action can be preemptively taken to correct tininess problems. The pessimistic tiny indicator 155 can also be signaled for other functions such as floating point fused multiply-add functions, floating point addition functions, and so forth.

The functional pipe 115 can output normal (i.e., non-tiny) results 130 associated with normal operations via line 175 and/or internal format (i.e., tiny) results 132 associated subnormal results via line 160. When the pessimistic tiny indicator 155 is signaled, a post-processing mode can begin (i.e., the scheduler 105 can cause the post-processing mode to be entered), and the schedule modification logic section 110 of the scheduler 105 can suppress the readiness and/or "pick" of dependent operations. In other words, with a sufficient early indicator that a result is likely going to be a tiny result, the schedule modification logic section 110 will not pick a dependent operation, but rather, can suppress such dependent operations for at least the length of the post-processing pipe 125. In addition, the schedule modification logic section 110 can cause a re-router section 180 to start re-routing the normal results 130 to the subnormal trombone post-processing pipe 125 via line 165 in the post-processing mode, instead of allowing the normal results 130 to pass through the multiplexor 135 and on to a writeback and/or forwarding stage 150. Such re-routing of both normal and subnormal operations during the post-processing mode provides for a more straight-forward control mechanism, and keeps the operations orderly and time-related. Moreover, when the pessimistic tiny indicator 155 is signaled, and the post-processing mode is entered, the subnormal trombone post-processing pipe 125 can receive the internal format results 132 directly from the functional pipe 115.

In some embodiments, all operations that are present, including operations having the normal results 130 and operations having the internal format results 132, can be forced to enter the subnormal trombone post-processing pipe 125 while in the post-processing mode. Some of such operations (e.g., internal format results 132) may themselves need post-processing. Other of such operations (e.g., normal results 130) may be simply passed through the post-processing pipe 125 in a pass-through fashion.

This maintains, from a forwarding and result-bus arbitration perspective, the relative pipe exit time of all of the operations. In other words, this prevents the need for re-arbitration of writeback. Put differently, the operations that come out of the post-processing pipe 125 can have the same relative times with respect to each other such that the relative timing maintains forward relationships and also writeback relationships, thereby guaranteeing that no collisions occur and that each operation is guaranteed a write-back slot in the writeback and/or forwarding stage 150. Otherwise, a problematic operation that would slide out in isolation might collide with another operation that didn't have to slide out in time.

When all of the operations in the vicinity of the tiny-generating operation are being forced to enter the subnormal trombone post-processing pipe 125 while in the post-processing mode, all of the operations suffer an extended operational latency. But when there is no tiny-generating operation in the vicinity of normal operations (i.e., when not in the post-processing mode), such normal operations experience no such latency penalty and pass directly to the writeback and/or forwarding stage 150 via line 175 through the multiplexor 135. Also, the temporary penalty that is suffered when in the post-processing mode is usually much smaller than a machine flush.

The routing of results (e.g., 130 and 132) to the post-processing pipe 125 in the post-processing mode allows the tiny-generating operation to execute its post-processing steps, including for example, denormalization and rounding. In some embodiments, the post-processing pipe 125 performs the denormalization and rounding on the internal format tiny results 132. In some embodiments, the schedule modification logic section 110 of the scheduler 105 does not pick any dependents of a tiny-generating operation to meet at its original completion cycle. The schedule modification logic section 110 of the scheduler 105 can, however, in the near future, pick dependent operations to meet the tiny-generating operation at its new completion cycle.

The tininess prediction and handler engine 100 can automatically recover from the post-processing mode. Without recovery, all future execution of operations would otherwise experience the additional latency of the post-processing pipe 125. In accordance with various embodiments of the present disclosure, different approaches can be taken for recovering from the post-processing mode.

In some embodiments, the schedule modification logic section 110 of the scheduler 105 can stop pick of all operations while in the post-processing mode responsive to the pessimistic tiny indicator 155 being asserted (e.g., turning regular writeback off), then wait for the functional pipe 115 and the subnormal trombone post-processing pipe 125 to empty all in-flight operations (including all normal operations and tiny-generating operations), and then start scheduling operations again to the functional pipe 115 in a non-post-processing mode, after having turned regular writeback back on.

In an alternate embodiment, the schedule modification logic section 110 of the scheduler 105 can continue the pick of operations to the functional pipe 115, and to continue routing all results from the functional pipe 115, including the normal results 130 and operations having the internal format results 132, to the subnormal trombone post-processing pipe 125, until a sufficiently wide lull (e.g., one or more time bubbles) in execution allows the scheduler 105 to switch pipe exit routing from the post-processing pipe 125 to the normal writeback and/or forwarding stage 150. In some embodiments, the lull can be associated with one or more naturally occurring time bubbles, which is more aggressive because while natural bubbles can occur frequently, there is some risk of operating for a longer period of time in the post-processing higher-latency mode. In some embodiments, the lull can be associated with one or more forced time bubbles to artificially create the lull, which has the benefit of potentially snapping out of the post-processing mode sooner. In other words, the schedule modification logic section 110 can intentionally insert time bubbles.

In some embodiments, a bubble can mean an absence of operations for a given time period. The bubbles can separate the operations that were already in-flight before the tiny problem was detected or predicted, and the operations that will be issued at a later time after resolving the tiny problem (i.e., after reverting from the post-processing mode back to the non-post-processing mode). After the lull (e.g., after no more operations are left in the functional pipe 115 and the post-processing pipe 125), then the tininess prediction and handler engine 100 can change from a post-processing mode to a non-post-processing mode and snap back to the lower latency normal path via line 175.

The tininess prediction and handler engine 100 can handle floating point numeric underflow cases while avoiding machine flushes. The in-pipe logic depth can be dynamically adjusted on a per operation basis. In other words, while the post-processing pipe 125 can be of a fixed logic depth, whether to route operations to the post-processing pipe 125 can be a dynamic decision based on the pessimistic tiny indicator 155. This contrasts with conventional technology in which a logic depth penalty is paid for every operation. In accordance with embodiments of the present disclosure, dependent operations of tiny-generating operations are not incorrectly picked, thereby removing the need to deal with their otherwise incorrect wakeup (e.g., killing them in-pipe or while in-flight). Machine flushes are avoided, which provides advantages both in terms of performance and energy costs. In addition, the functional pipe 115 can be kept simple and need not have special logic to deal with tiny-generating operations.

Figure 2:
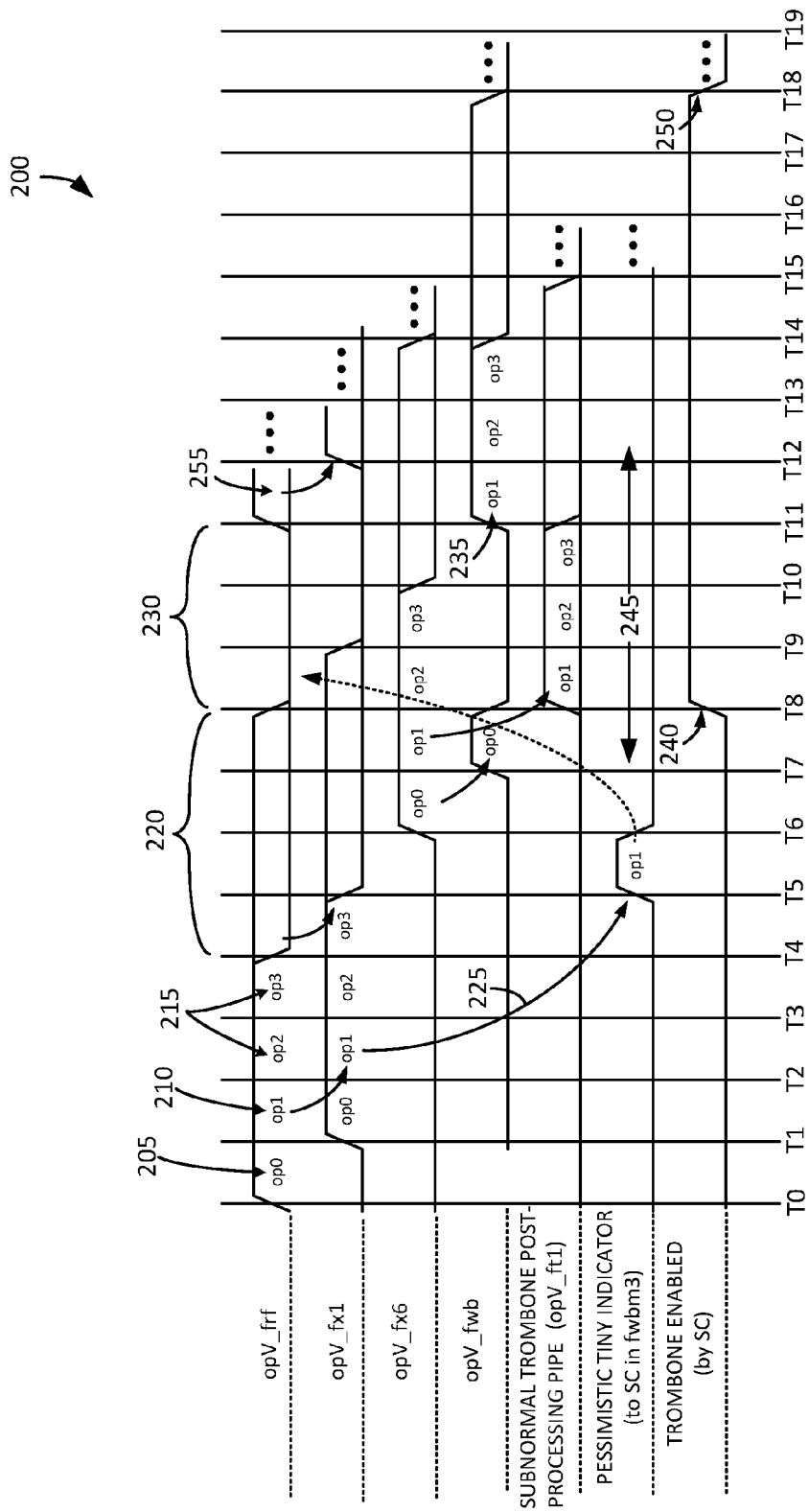
FIG. 2 is an example timing diagram for handling numeric underflow in accordance with embodiments of the present disclosure.

FIG. 2 is an example timing diagram 200 for handling numeric underflow in accordance with embodiments of the present disclosure. In this example, various stages (e.g., opV_frf, opV_fx1, opV_fx6, opV_fwb, opV_ft1, etc.) of various operations (op0, op1, op2, and op3) are shown. It will be understood that while the number of operations used in this example is four, any suitable number of operations can be involved. In addition, the stages of operation are not necessarily limited to those described herein.

The scheduler 105 (of FIG. 1) can begin scheduling operations (e.g., op0, op1, op2, and op3) at stage opV_frf. In this example, op0 shown at 205 and time T0, will generate a normal (i.e., non-tiny) result. The op1, shown at 210 and time T1, will generate a subnormal (i.e., tiny) result, which will trigger a pessimistic tiny indicator, as further described below. The op2 and op3, as shown at 215 and times T2 and T3, respectively, will have either normal or subnormal results, and will follow the op1 into the subnormal trombone post-processing pipe 125 (of FIG. 1). It will be understood that the assumptions of which operations will generate a normal or subnormal result are selected by way of example, and in other cases, the operations having normal or subnormal results can be different.

At 220 corresponding to times T4 through T7, the scheduler 105 (of FIG. 1) can continue to pick operations for execution. The functional pipe 115 (of FIG. 1) can accept and/or process the operations (e.g., op1, op2, op3, and op4) as shown at stage opV_fx1 times T1 through T4, and at stage opV_fx6, times T6 through T9. The writeback and/or forwarding stage 150 (of FIG. 1) can correspond to the opV_fwb stage as shown in FIG. 2. For example, the normal operation op0 can enter writeback at time T7, op1 can enter writeback at time T11, and so forth.

At 225, the pre-emptive tiny detection logic section 120 (of FIG. 1) of the function pipe 115 (of FIG. 1) can predict a subnormal (i.e., tiny) result associated with op1. At time T5 in the fwbm3 stage, the pre-emptive tiny detection logic section 120 can produce the pessimistic tiny indicator 155, which can be sent to the scheduler 105 (of FIG. 1). In response to the pessimistic tiny indicator 155, the schedule modification logic section 110 (of FIG. 1) of the scheduler 105 can schedule (e.g., insert bubbles or wait for natural bubbles) as shown at 230 from times T8 through T10. As a result, the writeback and/or forwarding stage 150 (of FIG. 1) can be delayed by a corresponding number of time slots as shown at 235, such that the op1 enters the writeback and/or forwarding stage 150 at time T11 rather than at time T8.

In the meanwhile, the subnormal trombone post-processing pipe 125 can process operations op1, op2, and op3 at times T8, T9, and T10, respectively, in stage opV_ft1. Such processing can include denormalization and rounding as explained in detail above. The subnormal trombone post-processing pipe 125 can be enabled by the scheduler 150 at time T8, as shown at 240, which can cause the tininess prediction and handler engine 100 to enter the post-processing mode. The scheduler 150 can also cause the re-router section 180 (of FIG. 1) to re-route the normal results 130 (of FIG. 1) to the subnormal trombone post-processing pipe 125 after the subnormal trombone post-processing pipe 125 is enabled, and while in the post-processing mode. In this manner, all of the operations op1, op2, and op3, and so forth, can be routed to the subnormal trombone post-processing pipe 125 during the post-processing mode. The scheduler modification logic section 110 of the scheduler 105 can cause the one or more time bubbles as shown at 230 responsive to the pessimistic tiny indicator 155. The subnormal trombone post-processing pipe 125 can process one or more normal results and one or more internal format results (e.g., op1, op2, and op3) during time slots corresponding to the one or more time bubbles shown at 230 (e.g., at times T8, T9, and T10).

It is possible that op2, op3, etc., can make independent trombone requests as shown at 245. For example, the schedule modification logic section 110 can cause one or more additional pessimistic tiny indicators 155 to be generated with respect to these individual follow-on operations. In such a case, the trombone length need not change. As shown at 250, the trombone can be retracted at time T18 by the scheduler 150, thereby completing recovery from the post-processing mode. The schedule modification logic section 110 can cause a new operation that can be picked and/or inserted at 255, time T11, and so forth.

Figure 3:
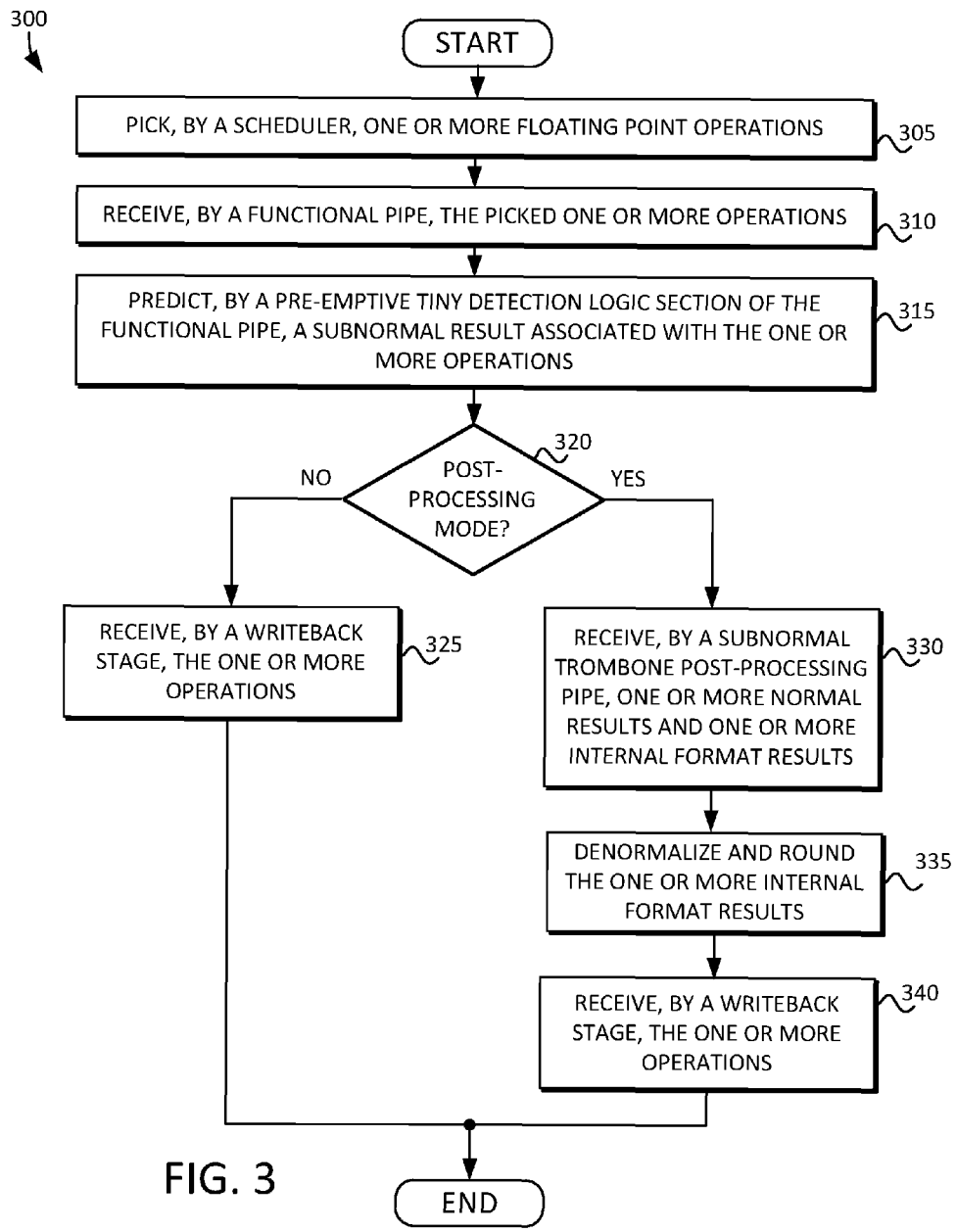
FIG. 3 shows an example flow diagram illustrating a technique for handling numeric underflow in a floating point unit in accordance with embodiments of the present disclosure.

FIG. 3 shows an example flow diagram 300 illustrating a technique for handling numeric underflow in a floating point unit in accordance with embodiments of the present disclosure. At 305, a scheduler modification logic section of a scheduler picks one or more floating point operations. At 310, a functional pipe receives the picked one or more floating point operations. At 315, a pre-emptive tiny detection logic section of the functional pipe predicts a subnormal result associated with the one or more floating point operations. At 320, a determination can be made whether or not a tininess prediction and handler engine is in a post-processing mode. If the tininess prediction and handler engine is not in the post-processing mode, the one or more normal operations are received by a writeback stage at 325.

Otherwise, the tininess prediction and handler engine is in a post-processing mode, a subnormal trombone post-processing pipe receives one or more normal results and one or more internal formal results at 330. At 335, the subnormal trombone post-processing pipe denormalizes and rounds the one or more internal format results. At 340, the one or more operations are received by a writeback stage.

Figure 4:
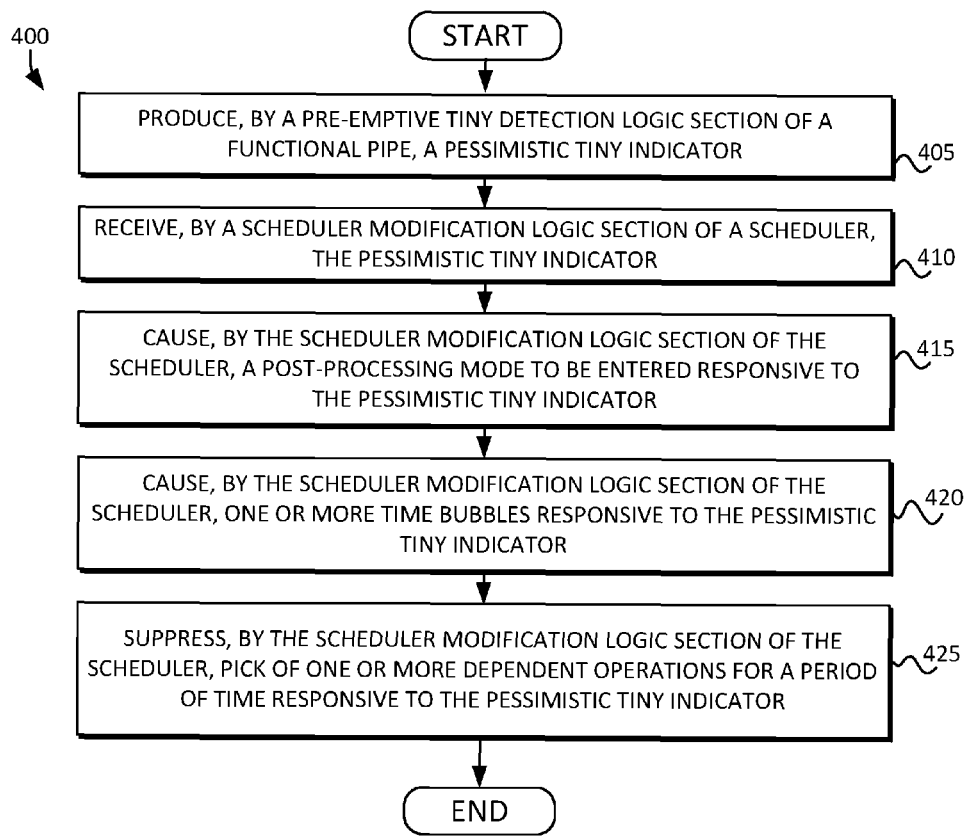
FIG. 4 shows another example flow diagram illustrating a technique for handling numeric underflow in a floating point unit in accordance with embodiments of the present disclosure.

FIG. 4 shows another example flow diagram 400 illustrating a technique for handling numeric underflow in a floating point unit in accordance with embodiments of the present disclosure. At 405, a pre-emptive tiny detection logic section of the functional pipe produces a pessimistic tiny indicator responsive to predicting a subnormal result associated with the one or more floating point operations. At 410, the scheduler modification logic section of the scheduler receives the pessimistic tiny indicator from the pre-emptive tiny detection logic section of the functional pipe. At 415, the scheduler modification logic section of the scheduler causes the post-processing mode to be entered as responsive to the pessimistic tiny indicator. At 420, the scheduler modification logic section of the scheduler causes one or more time bubbles to be responsive to the pessimistic tiny indicator. At 425, the scheduler modification logic section of the scheduler suppresses a pick of one or more dependent operations that depend on the one or more floating point operations for a period of time that are responsive to the pessimistic tiny indicator. In some embodiments, a combination of bubble insertion and pick suppression can be used. If there is no tiny prediction, then neither bubble insertion at 420 nor pick suppression at 425 is performed.

The steps shown in FIGS. 3 and 4 need not occur in the order illustrated, but rather, can occur in a different order and/or with intervening steps.

FIG. 5-10 are schematic diagrams of a various devices in which the tininess prediction and handler engine of FIG. 1 can be embedded, in accordance with embodiments of the present disclosure.

Figure 5:
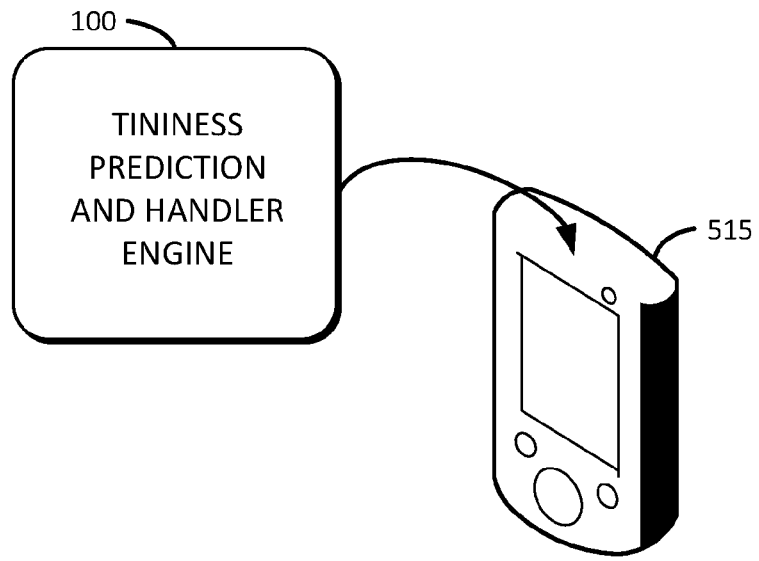
FIG. 5-10 are schematic diagrams of a various devices in which the tininess prediction and handler engine of FIG. 1 can be embedded, in accordance with the present disclosure.
Figure 6:
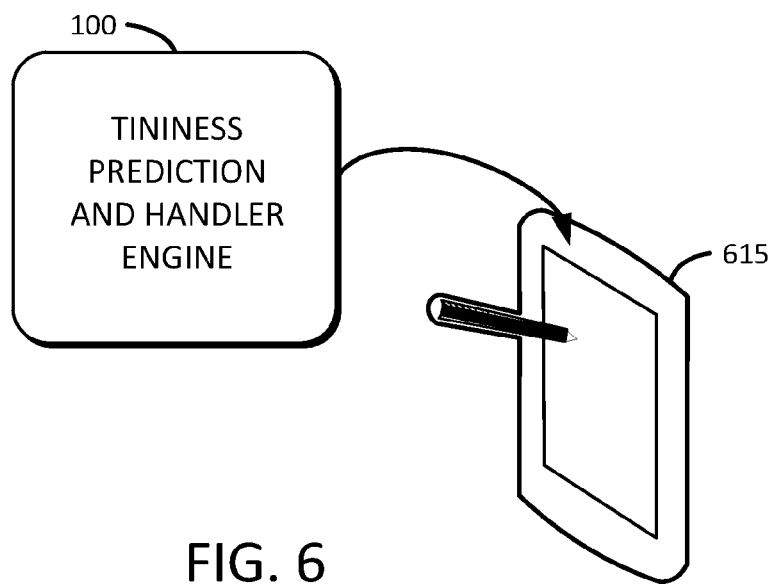
Figure 7:
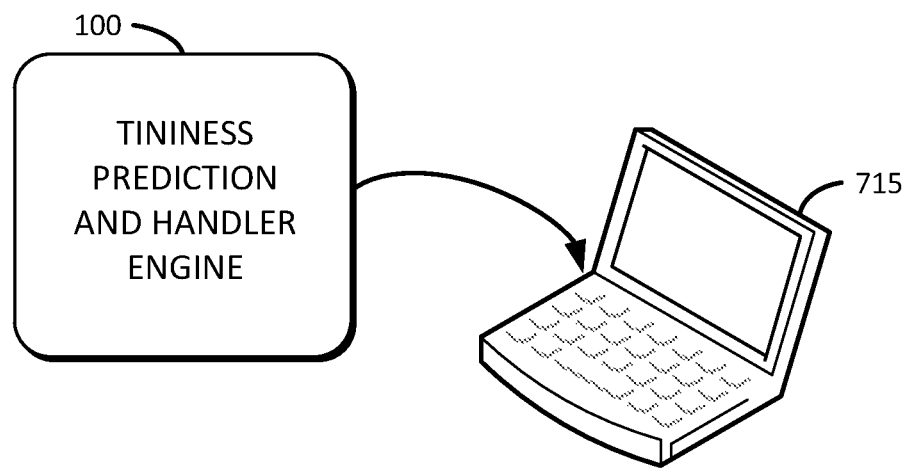
Figure 8:
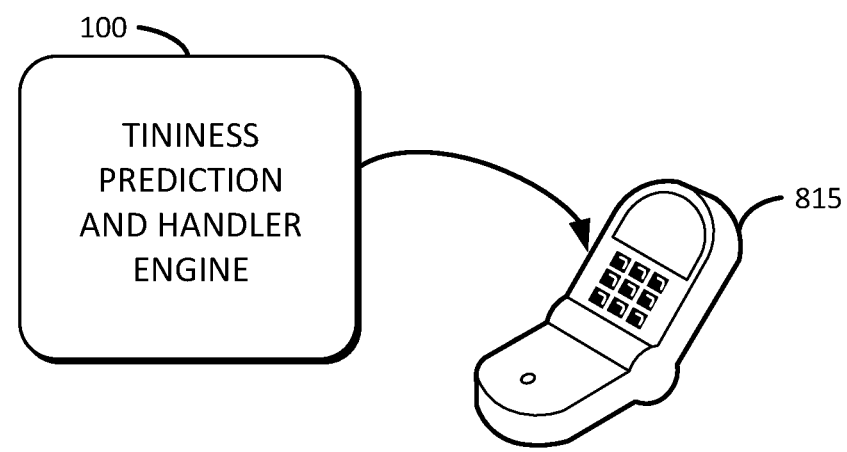
Figure 9:
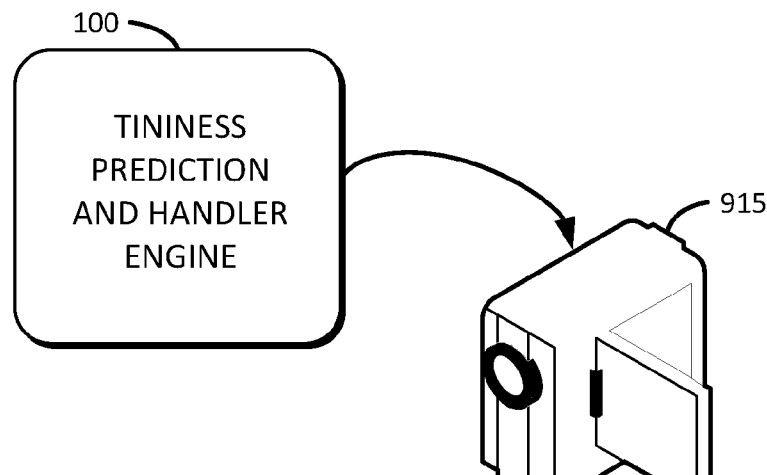
Figure 10:
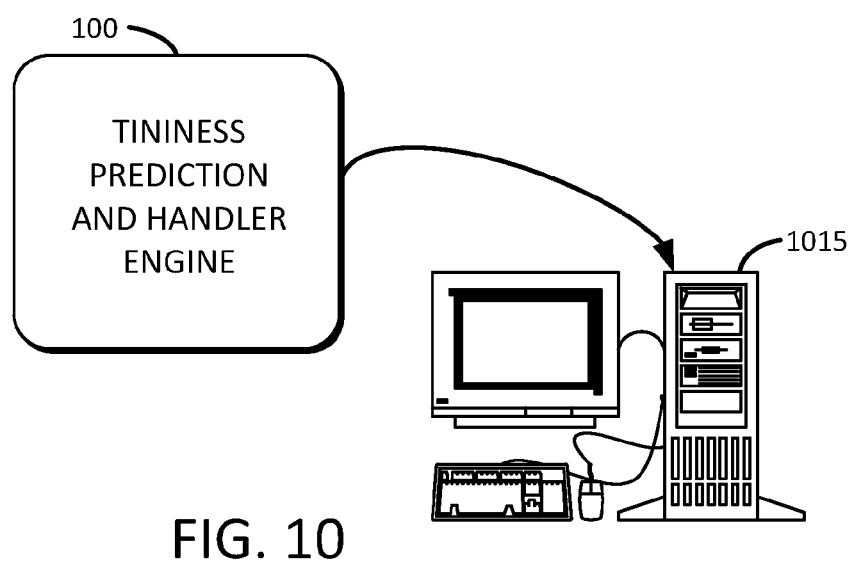

For example, as can be seen in FIG. 5, smart phone 515 can include the tininess prediction and handler engine 100, as described in detail above. Similarly, the tablet 615 shown in FIG. 6, the notebook computer 715 shown in FIG. 7, the mobile phone 815 shown in FIG. 8, the camera 915 shown in FIG. 9, and the desktop computer 1015 shown in FIG. 10 can include the tininess prediction and handler engine 100, as described in detail above. It will be understood that any suitable device can include or otherwise operate with the tininess prediction and handler engine 100, as described in detail above.

Figure 11:
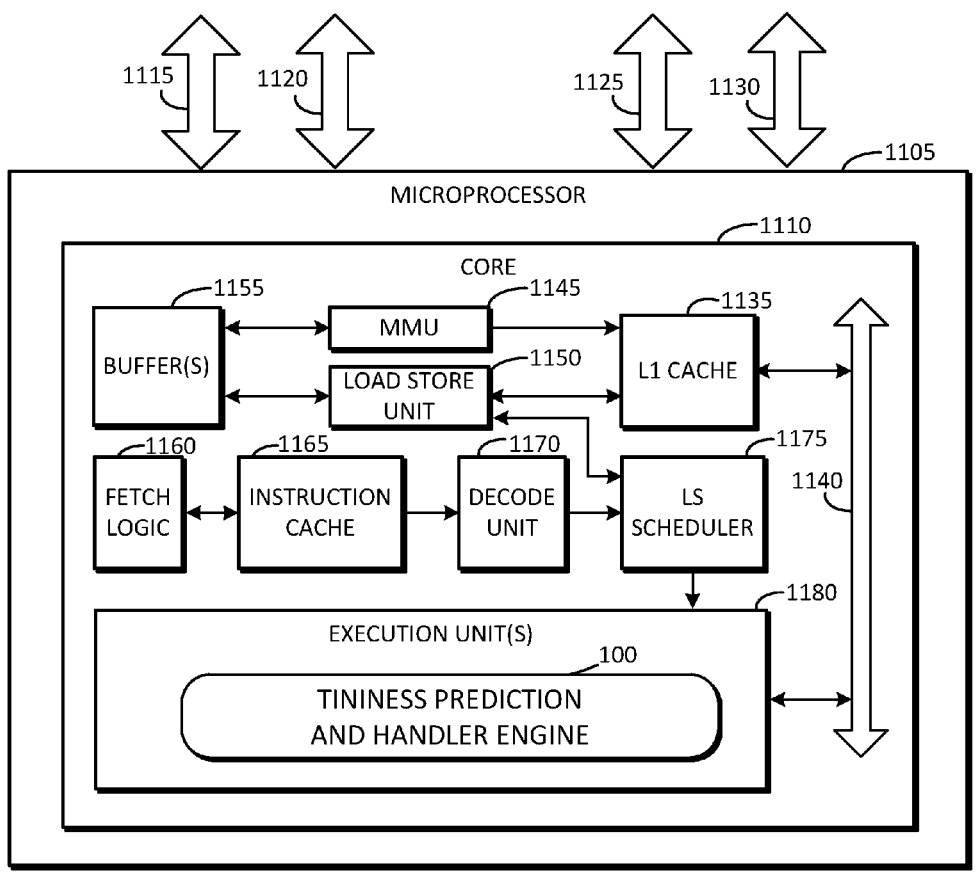
FIG. 11 is a block diagram of a microprocessor including the tininess prediction and handler engine of FIG. 1.

FIG. 11 is a block diagram of a microprocessor 1105 including the tininess prediction and handler engine 100 of FIG. 1. The microprocessor 1105 can include a processor core 1110. The microprocessor 1105 can include a network interface 1115, an interface 1120 with one or more peripheral devices (not shown), a system memory interface 1125, and/or an interface 1130 with one or more other processors (not shown). The processor core 1110 can include a level 1 (L1) cache 1135. The L1 cache 1135 can be coupled to and interface with a bus 1140. The processor core 1110 can include a memory management unit (MMU) 1145 and a load store unit 1150, which are coupled to the L1 cache 1135. One or more buffers 1155 can be coupled to the MMU 1145 and/or to the load store unit 1150. The one or more buffers 1155 can interface with one or more higher level caches (not shown).

The processor core 1110 of the microprocessor 1105 can further include fetch logic 1160, an instruction cache 1165, a decode unit 1170, and an LS scheduler 1175. The fetch logic 1160 can interface with the instruction cache 1165. The instruction cache 1165 can interface with the decode unit 1170. The decode unit 1170 can interface with the LS scheduler 1175. The LS scheduler 1175 can be coupled to the load store unit 1150 and to one or more execution units 1180. The one or more execution units 1180 can be coupled to and interface with the bus 1140. The one or more execution units 1180 can include the tininess prediction and handler engine 100 described in detail above.

In some embodiments, a tininess prediction and handler engine includes a scheduler having a scheduler modification logic section configured to pick one or more floating point operations, and a functional pipe coupled to the scheduler and configured to receive the picked one or more floating point operations. The functional pipe can include a pre-emptive tiny detection logic section configured to predict a subnormal result associated with the one or more floating point operations. The tininess prediction and handler engine can further include a subnormal trombone post-processing pipe coupled to the functional pipe, which can be configured to receive the one or more floating point operations while in a post-processing mode.

In some embodiments, the pre-emptive tiny detection logic section of the functional pipe is configured to produce a pessimistic tiny indicator responsive to predicting the subnormal result associated with the one or more floating point operations. In some embodiments, the scheduler modification logic section of the scheduler is configured to receive the pessimistic tiny indicator from the pre-emptive tiny detection logic section of the functional pipe, and to cause the post-processing mode to be entered responsive to the pessimistic tiny indicator.

In some embodiments, the scheduler modification logic section of the scheduler is configured to cause one or more time bubbles responsive to the pessimistic tiny indicator. In some embodiments, the scheduler modification logic section of the scheduler is configured to suppress pick of one or more dependent operations that depend on the one or more floating point operations for a period of time responsive to the pessimistic tiny indicator.

In some embodiments, the functional pipe is configured to generate one or more normal results associated with the one or more floating point operations and one or more internal format results associated with the one or more floating point operations. In some embodiments, the subnormal trombone post-processing pipe is configured to receive the one or more normal results and the one or more internal format results while in the post-processing mode.

The tininess prediction and handler engine can further include a re-router section configured to re-route the one or more normal results to the subnormal trombone post-processing pipe responsive to entering the post-processing mode.

The tininess prediction and handler engine can further include a multiplexor coupled to an output of the re-router section and to an output of the subnormal trombone post-processing pipe, and configured to select between the output of the re-router section and the output of the subnormal trombone post-processing pipe, and to transmit the selected output to a writeback stage.

In some embodiments, the subnormal trombone post-processing pipe is configured to denormalize and round the one or more internal format results while in the post-processing mode. In some embodiments, the re-router section is configured to not re-route the one or more normal results to the subnormal trombone post-processing pipe while not in the post-processing mode.

In some embodiments, the subnormal result refers to a predicted tiny result, and the pre-emptive tiny detection logic section is configured to produce a pessimistic tiny indicator responsive to the predicted tiny result associated with the one or more floating point operations.

In some embodiments, the scheduler modification logic section of the scheduler is configured to cause one or more time bubbles responsive to the pessimistic tiny indicator, and the subnormal trombone post-processing pipe is configured to process the one or more internal format results and pass through the one or more normal results during time slots corresponding to the one or more time bubbles.

In some embodiments, the subnormal trombone post-processing pipe is configured to denormalize and round the one or more internal format results during time slots corresponding to the one or more time bubbles.

Embodiments of the present disclosure can include a method for handling numeric underflow using a tininess prediction and handler engine. The method can include picking, by a scheduler modification logic section of a scheduler, one or more floating point operations. The method can include receiving, by a functional pipe, the picked one or more floating point operations. The method can include predicting, by a pre-emptive tiny detection logic section of the functional pipe, a subnormal result associated with the one or more floating point operations. The method can include receiving, by a subnormal trombone post-processing pipe, the one or more floating point operations while in a post-processing mode.

The method can include producing, by the pre-emptive tiny detection logic section of the functional pipe, a pessimistic tiny indicator responsive to predicting the subnormal result associated with the one or more floating point operations. The method can include receiving, by the scheduler modification logic section of the scheduler, the pessimistic tiny indicator from the pre-emptive tiny detection logic section of the functional pipe. The method can include causing, by the scheduler modification logic section of the scheduler, the post-processing mode to be entered responsive to the pessimistic tiny indicator.

In some embodiments, the method can include causing, by the scheduler modification logic section of the scheduler, one or more time bubbles responsive to the pessimistic tiny indicator. The method can include suppressing, by the scheduler modification logic section of the scheduler, pick of one or more dependent operations that depend on the one or more floating point operations for a period of time responsive to the pessimistic tiny indicator. The method can include generating, by the functional pipe, one or more normal results associated with the one or more floating point operations and one or more internal format results associated with the one or more floating point operations. The method can include re-routing, by a re-router section, the one or more normal results to the subnormal trombone post-processing pipe responsive to entering the post-processing mode. The method can include receiving, by the subnormal trombone post-processing pipe, the one or more normal results and the one or more internal format results while in the post-processing mode.

In some embodiments, the method can include denormalizing, by the subnormal trombone post-processing pipe, the one or more internal format results while in the post-processing mode. The method can include rounding, by the subnormal trombone post-processing pipe, the one or more internal format results while in the post-processing mode. The method can include selecting, by a multiplexor, between an output of the re-router section and an output of the subnormal trombone post-processing pipe. The method can include transmitting, by the multiplexor, the selected output to a writeback stage. The method can include causing, by the scheduler modification logic section of the scheduler, one or more time bubbles responsive to the pessimistic tiny indicator. The method can include processing, by the subnormal trombone post-processing pipe, the one or more internal format results during time slots corresponding to the one or more time bubbles. The method can include passing through, by the subnormal trombone post-processing pipe, the one or more normal results.

Embodiments of the present disclosure can include a mobile device. The mobile device can include a processor, a display coupled to the processor, a user interface configured to be displayed on the display, and a tininess prediction and handler engine coupled to the processor, the tininess prediction and handler engine.

The following discussion is intended to provide a brief, general description of a suitable machine or machines in which certain aspects of the present disclosure can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present disclosure can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the embodiments of the present disclosure with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the present disclosure" or the like are used herein, these phrases are meant to generally reference embodiment possibilities, and are not intended to limit the disclosure to particular embodiment configurations. As used herein, these terms can reference the same or different embodiments that are combinable into other embodiments.

Embodiments of the present disclosure may include a non-transitory machine-readable medium comprising instructions executable by one or more processors, the instructions comprising instructions to perform the elements of the disclosure as described herein.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure.

Accordingly, all such modifications are intended to be included within the scope of this disclosure as defined in the claims.

What is claimed is:

1. A tininess prediction and handler engine, comprising:
   a scheduler including a scheduler modification logic section configured to pick one or more floating point operations;
   a functional pipe coupled to the scheduler and configured to receive the picked one or more floating point operations, wherein the functional pipe includes a pre-emptive tiny detection logic section configured to predict a subnormal result associated with the one or more floating point operations; and
   a subnormal trombone post-processing pipe coupled to the functional pipe, and configured to receive the one or more floating point operations while in a post-processing mode,
   wherein the functional pipe is configured to generate one or more normal results associated with the one or more floating point operations and one or more internal format results associated with the one or more floating point operations; and
   wherein the subnormal trombone post-processing pipe is configured to denormalize and round the one or more internal format results while in the post-processing mode.

2. The tininess prediction and handler engine of claim 1, wherein:
   the pre-emptive tiny detection logic section of the functional pipe is configured to produce a pessimistic tiny indicator responsive to predicting the subnormal result associated with the one or more floating point operations; and
   the scheduler modification logic section of the scheduler is configured to receive the pessimistic tiny indicator from the pre-emptive tiny detection logic section of the functional pipe, and to cause the post-processing mode to be entered responsive to the pessimistic tiny indicator.

3. The tininess prediction and handler engine of claim 2, wherein:
   the scheduler modification logic section of the scheduler is configured to cause one or more time bubbles responsive to the pessimistic tiny indicator.

4. The tininess prediction and handler engine of claim 2, wherein:
   the scheduler modification logic section of the scheduler is configured to suppress pick of one or more dependent operations that depend on the one or more floating point operations for a period of time responsive to the pessimistic tiny indicator.

5. The tininess prediction and handler engine of claim 1, further comprising:
   a re-router section configured to re-route the one or more normal results to the subnormal trombone post-processing pipe responsive to entering the post-processing mode,
   a multiplexor coupled to an output of the re-router section and to an output of the subnormal trombone post-processing pipe, and configured to select between the output of the re-router section and the output of the subnormal trombone post-processing pipe, and to transmit the selected output to a writeback stage;
   wherein:
   the pre-emptive tiny detection logic section of the functional pipe is configured to produce a pessimistic tiny indicator responsive to predicting the subnormal result associated with the one or more floating point operations;
   the scheduler modification logic section of the scheduler is configured to receive the pessimistic tiny indicator from the pre-emptive tiny detection logic section of the functional pipe, and to cause the post-processing mode to be entered responsive to the pessimistic tiny indicator;
   the scheduler modification logic section of the scheduler is configured to cause one or more time bubbles responsive to the pessimistic tiny indicator;
   the scheduler modification logic section of the scheduler is configured to suppress pick of one or more dependent operations that depend on the one or more floating point operations for a period of time responsive to the pessimistic tiny indicator;
   the subnormal trombone post-processing pipe is configured to receive the one or more normal results and the one or more internal format results while in the post-processing mode;
   the re-router section is configured to not re-route the one or more normal results to the subnormal trombone post-processing pipe while not in the post-processing mode;
   the subnormal result refers to a predicted tiny result;
   the pre-emptive tiny detection logic section is configured to produce a pessimistic tiny indicator responsive to the predicted tiny result associated with the one or more floating point operations;
   the scheduler modification logic section of the scheduler is configured to cause one or more time bubbles responsive to the pessimistic tiny indicator;
   the subnormal trombone post-processing pipe is configured to process the one or more internal format results and pass through the one or more normal results during time slots corresponding to the one or more time bubbles; and
   the subnormal trombone post-processing pipe is configured to denormalize and round the one or more internal format results during time slots corresponding to the one or more time bubbles.

6. The tininess prediction and handler engine of claim 1, wherein:
   the subnormal trombone post-processing pipe is configured to receive the one or more normal results and the one or more internal format results while in the post-processing mode.

7. The tininess prediction and handler engine of claim 1, further comprising:
   a re-router section configured to re-route the one or more normal results to the subnormal trombone post-processing pipe responsive to entering the post-processing mode.

8. The tininess prediction and handler engine of claim 7, further comprising:
   a multiplexor coupled to an output of the re-router section and to an output of the subnormal trombone post-processing pipe, and configured to select between the output of the re-router section and the output of the subnormal trombone post-processing pipe, and to transmit the selected output to a writeback stage.

9. The tininess prediction and handler engine of claim 7, wherein:

the re-router section is configured to not re-route the one or more normal results to the subnormal trombone post-processing pipe while not in the post-processing mode.

10. The tininess prediction and handler engine of claim 1, wherein:
the subnormal result refers to a predicted tiny result; and
the pre-emptive tiny detection logic section is configured to produce a pessimistic tiny indicator responsive to the predicted tiny result associated with the one or more floating point operations.

11. The tininess prediction and handler engine of claim 10, wherein:
the scheduler modification logic section of the scheduler is configured to cause one or more time bubbles responsive to the pessimistic tiny indicator; and
the subnormal trombone post-processing pipe is configured to process the one or more internal format results and pass through the one or more normal results during time slots corresponding to the one or more time bubbles.

12. The tininess prediction and handler engine of claim 10, wherein:
the subnormal trombone post-processing pipe is configured to denormalize and round the one or more internal format results during time slots corresponding to the one or more time bubbles.

13. A method for handling numeric underflow using a tininess prediction and handler engine, the method comprising:
picking, by a scheduler modification logic section of a scheduler, one or more floating point operations;
receiving, by a functional pipe, the picked one or more floating point operations;
predicting, by a pre-emptive tiny detection logic section of the functional pipe, a subnormal result associated with the one or more floating point operations;
receiving, by a subnormal trombone post-processing pipe, the one or more floating point operations while in a post-processing mode;
generating, by the functional pipe, one or more normal results associated with the one or more floating point operations and one or more internal format results associated with the one or more floating point operations;
re-routing, by a re-router section, the one or more normal results to the subnormal trombone post-processing pipe responsive to entering the post-processing mode;
receiving, by the subnormal trombone post-processing pipe, the one or more normal results and the one or more internal format results while in the post-processing mode;
denormalizing, by the subnormal trombone post-processing pipe, the one or more internal format results while in the post-processing mode;
rounding, by the subnormal trombone post-processing pipe, the one or more internal format results while in the post-processing mode;
selecting, by a multiplexor, between an output of the re-router section and an output of the subnormal trombone post-processing pipe; and
transmitting, by the multiplexor, the selected output to a writeback stage.

14. The method of claim 13, further comprising:
producing, by the pre-emptive tiny detection logic section of the functional pipe, a pessimistic tiny indicator responsive to predicting the subnormal result associated with the one or more floating point operations; and
receiving, by the scheduler modification logic section of the scheduler, the pessimistic tiny indicator from the pre-emptive tiny detection logic section of the functional pipe; and
causing, by the scheduler modification logic section of the scheduler, the post-processing mode to be entered responsive to the pessimistic tiny indicator.

15. The method of claim 14, further comprising:
causing, by the scheduler modification logic section of the scheduler, one or more time bubbles responsive to the pessimistic tiny indicator.

16. The method of claim 14, further comprising:
suppressing, by the scheduler modification logic section of the scheduler, pick of one or more dependent operations that depend on the one or more floating point operations for a period of time responsive to the pessimistic tiny indicator.

17. The method of claim 13, further comprising:
causing, by the scheduler modification logic section of the scheduler, one or more time bubbles responsive to the pessimistic tiny indicator;
processing, by the subnormal trombone post-processing pipe, the one or more internal format results during time slots corresponding to the one or more time bubbles; and
passing through, by the subnormal trombone post-processing pipe, the one or more normal results.

18. A mobile device, comprising:
a processor;
a display coupled to the processor;
a user interface configured to be displayed on the display; and
a tininess prediction and handler engine coupled to the processor, the tininess prediction and handler engine comprising:
a scheduler including a scheduler modification logic section configured to pick one or more floating point operations;
a functional pipe coupled to the scheduler and configured to receive the picked one or more floating point operations, wherein the functional pipe includes a pre-emptive tiny detection logic section configured to predict a subnormal result associated with the one or more floating point operations; and
a subnormal trombone post-processing pipe coupled to the functional pipe, and configured to receive the one or more floating point operations while in a post-processing mode,
wherein the functional pipe is configured to generate one or more normal results associated with the one or more floating point operations and one or more internal format results associated with the one or more floating point operations; and
wherein the subnormal trombone post-processing pipe is configured to denormalize and round the one or more internal format results while in the post-processing mode.

* * * * *